US008548675B2

(12) United States Patent
Yamaura

(10) Patent No.: US 8,548,675 B2
(45) Date of Patent: Oct. 1, 2013

(54) DIAGNOSING SYSTEM FOR DIAGNOSING CONTROL DEVICE OF VEHICLE-MOUNTED EQUIPMENT

(75) Inventor: Tamotsu Yamaura, Atsugi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 507 days.

(21) Appl. No.: 12/834,387

(22) Filed: Jul. 12, 2010

(65) Prior Publication Data

US 2011/0015825 A1    Jan. 20, 2011

(30) Foreign Application Priority Data

Jul. 15, 2009   (JP) ................................ 2009-166653

(51) Int. Cl.
*G06F 7/00* (2006.01)

(52) U.S. Cl.
USPC ........................................................ 701/34.4

(58) Field of Classification Search
USPC ........................................ 701/22, 24, 35, 36
See application file for complete search history.

(56) References Cited

U.S. PATENT DOCUMENTS

| | | | | |
|---|---|---|---|---|
| 5,469,563 A * | 11/1995 | Morita | | 714/25 |
| 5,594,646 A * | 1/1997 | Itoh et al. | | 701/33.6 |
| 5,631,910 A * | 5/1997 | Nozuyama et al. | | 714/724 |
| 5,659,550 A * | 8/1997 | Mehrotra et al. | | 714/721 |
| 5,923,677 A * | 7/1999 | Aihara | | 714/738 |
| 6,065,136 A * | 5/2000 | Kuwabara | | 714/31 |
| 6,985,802 B2 * | 1/2006 | Hedges | | 701/33.4 |
| 7,222,313 B2 * | 5/2007 | Bullis et al. | | 710/8 |
| 7,240,238 B2 * | 7/2007 | Yanai et al. | | 714/6.32 |
| 7,373,448 B2 * | 5/2008 | Dickens et al. | | 710/309 |
| 7,603,444 B2 * | 10/2009 | Bullis | | 709/220 |
| 7,616,484 B2 * | 11/2009 | Auclair et al. | | 365/185.09 |
| 7,673,271 B1 * | 3/2010 | Becker et al. | | 716/101 |
| 7,821,841 B2 * | 10/2010 | Kim | | 365/185.32 |
| 7,994,776 B2 * | 8/2011 | Yamaura et al. | | 324/207.25 |
| 2004/0122563 A1 * | 6/2004 | Okada et al. | | 701/1 |
| 2004/0161064 A1 * | 8/2004 | Brethour et al. | | 375/347 |
| 2004/0237010 A1 * | 11/2004 | Auclair et al. | | 714/721 |
| 2005/0083726 A1 * | 4/2005 | Auclair et al. | | 365/154 |
| 2007/0093948 A1 * | 4/2007 | Sago | | 701/29 |
| 2008/0201035 A1 * | 8/2008 | Kondoh et al. | | 701/33 |
| 2008/0306650 A1 * | 12/2008 | Nakagaki | | 701/30 |
| 2011/0190978 A1 * | 8/2011 | Mao et al. | | 701/35 |

FOREIGN PATENT DOCUMENTS

JP    2003-026024 A    1/2003

* cited by examiner

*Primary Examiner* — Thomas Tarcza
*Assistant Examiner* — Alex C Dunn
(74) *Attorney, Agent, or Firm* — Foley & Lardner LLP

(57) ABSTRACT

A diagnosing system for diagnosing a control device of a vehicle-mounted equipment is provided, which has a chip of integrated circuit that stores a control program data for controlling the vehicle-mounted equipment, a control program data storage zone arranged in the chip and storing the control program data for controlling the vehicle-mounted equipment, a diagnosing data storage zone arranged in the chip and storing a diagnosing data that is provided by modifying the control program data and a data abnormality diagnosing section that detects an abnormality of the control program data by comparing the control program data with the diagnosing data.

14 Claims, 13 Drawing Sheets

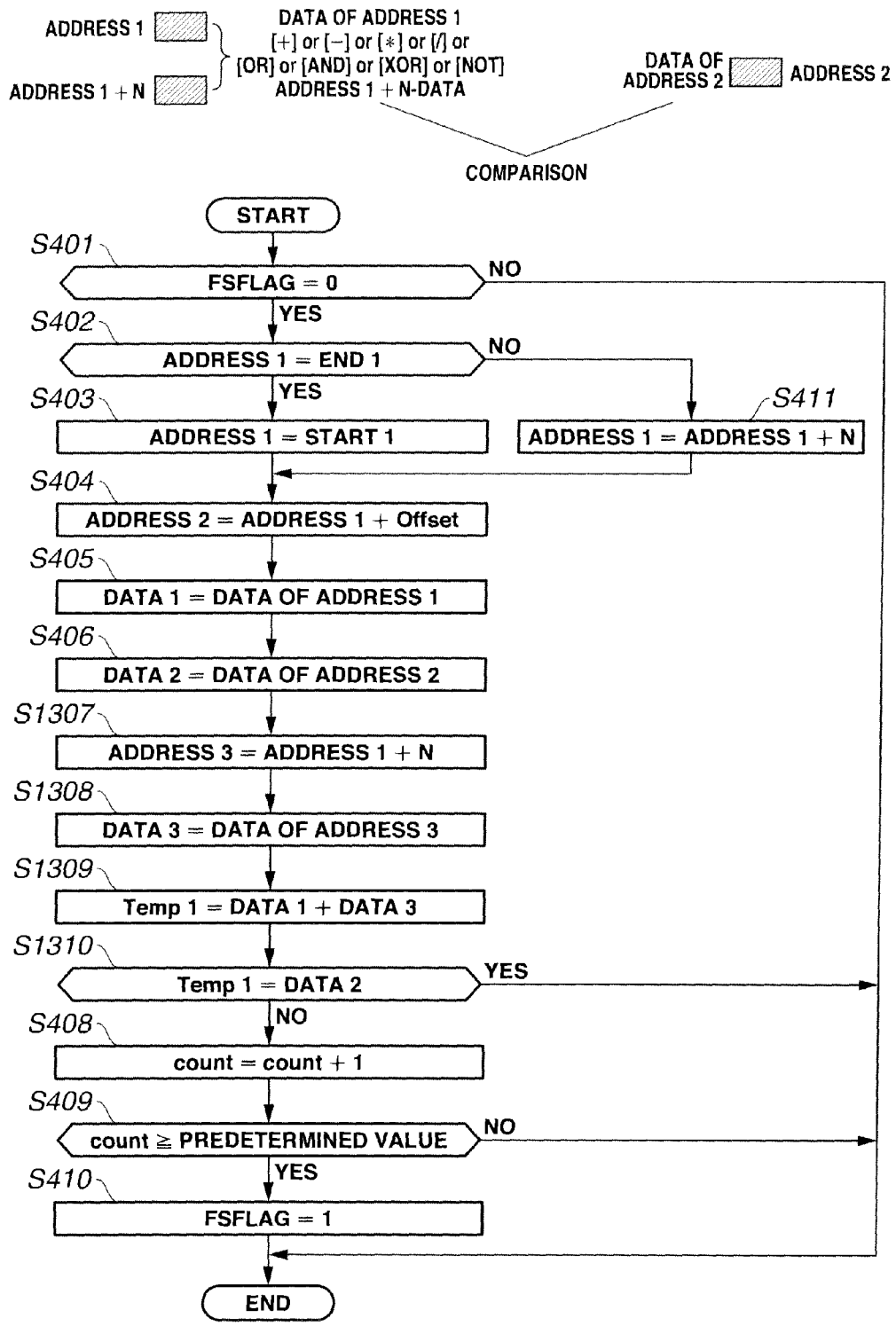

DIAGNOSING SYSTEM FOR DIAGNOSING CONTROL DEVICE OF VEHICLE-MOUNTED EQUIPMENT

BACKGROUND OF THE INVENTION

1. Field of the Invention

The present invention relates in general to diagnosing systems for diagnosing a control device of a vehicle-mounted equipment, and more particularly to the diagnosing systems of a type that diagnoses a memory of the control device of the vehicle-mounted equipment.

2. Description of the Related Art

Hitherto, in the field of motor vehicles, various diagnosing systems for diagnosing a control device of a vehicle-mounted equipment have been proposed and put into practical use. One of them is disclosed in Japanese Laid-open Patent Application (tokkai) 2003-26024.

The diagnosing system disclosed by the publication is a system that diagnoses a control device of a power steering device mounted on a wheeled motor vehicle. The diagnosing system of the publication comprises a primary microcomputer and a secondary microcomputer between which various data signals are transmitted under operation. That is, one of the microcomputers that is serving as a data receiving computer judges whether a data receiving is regularly or normally made or not, and if the data receiving is not regularly or normally carried out, judgment is so made that the other microcomputer has a trouble. Furthermore, when, upon diagnosing the received data, the microcomputer serving as the data receiving computer finds that the data is abnormal, judgment is so made that the other microcomputer has a trouble.

SUMMARY OF THE INVENTION

In the diagnosing system disclosed in the above-mentioned publication 2003-26024, the diagnosis is carried out through signal communications through wires extending between the two microcomputers, and thus, due to the limit of the communication speed exhibited by such wires, it has been difficult to obtain a satisfied diagnosis speed and diagnosis accuracy.

The present invention is provided by taking the above-mentioned drawbacks of the above-mentioned diagnosing system of the publication 2003-26024 into consideration and aims to provide a diagnosing system for diagnosing a control device of a vehicle-mounted equipment, which exhibits a satisfied diagnosis speed and diagnosis accuracy.

In order to establish the aim of the invention, both a control program data storage zone and a diagnosing data storage zone are provided in the same integrated-circuit chip, and by comparing two types of data stored in the respective zones, abnormality of the control program data is diagnosed. In this case, there is no need of using signal communication wires and thus, diagnosing speed as well as reliability of the diagnosis are increased.

In accordance with a first aspect of the present invention, there is provided a diagnosing system for diagnosing a control device of a vehicle-mounted equipment, which comprises a chip of integrated circuit that stores a control program data for controlling the vehicle-mounted equipment; a control program data storage zone that is arranged in the chip and stores the control program data for controlling the vehicle-mounted equipment; a diagnosing data storage zone that is arranged in the chip and stores a diagnosing data that is the same as the control program data, the diagnosing data being provided by subjecting the control program data to an offset addressing; and a data abnormality diagnosing section that is arranged in the chip and detects an abnormality of the control program data by comparing the control program data with the diagnosing data.

In accordance with a second aspect of the present invention, there is provided a diagnosing system for diagnosing a control device of a vehicle-mounted equipment, which comprises a chip of integrated circuit that stores a control program data for controlling the vehicle-mounted equipment; a control program data storage zone that is arranged in the chip and stores the control program data for controlling the vehicle-mounted equipment; a diagnosing data storage zone that is arranged in the chip and stores a diagnosing data provided by subjecting the control program data to a bit flipping; and a data abnormality diagnosing section that is arranged in the chip and detects an abnormality of the control program data by comparing the control program data with the diagnosing data.

In accordance with a third aspect of the present invention, there is provided a diagnosing system for diagnosing a control device of a vehicle-mounted equipment, which comprises a chip of integrated circuit that stores a control program data for controlling the vehicle-mounted equipment; a control program data storage zone that is arranged in the chip and stores the control program data for controlling the vehicle-mounted equipment; a diagnosing data storage zone that is arranged in the chip and stores a diagnosing data provided by subjecting the control program data to a function transformation; and a data abnormality diagnosing section that is arranged in the chip to detect abnormality of the control program data by comparing the control program data with the diagnosing data.

BRIEF DESCRIPTION OF THE DRAWINGS

Other objects and advantages of the present invention will become apparent from the following description when taken in conjunction with the accompanying drawings, in which:

FIG. 13 is a flowchart similar to FIG. 4, but showing operation steps executed in a control unit employed in a seventh embodiment of the present invention for establishing a data abnormality diagnosing process.

DETAILED DESCRIPTION OF THE INVENTION

In the following, the diagnosing system of the present invention will be described in detail with the aid of the attached drawings.

Figure 1:
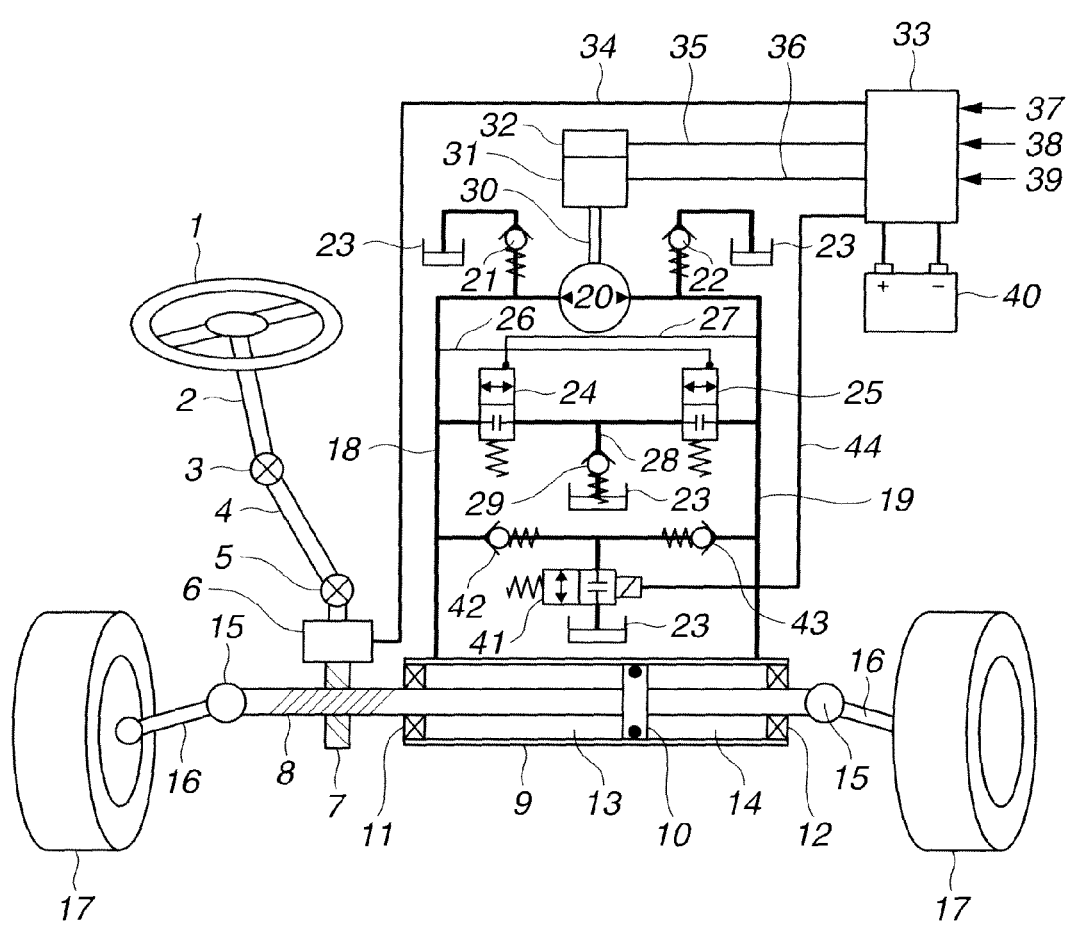
FIG. 1 is a schematic view of a power steering device of a motor system to which a first embodiment of the diagnosing system of the present invention is practically applied.

Referring to FIG. 1, there is shown a power steering device of a motor vehicle to which a diagnosing system of a first embodiment of the present invention is practically applied.

It is to be noted that the drawing of FIG. 1 is viewed from a front of the motor vehicle.

It is further to be noted that in the following description, directional terms, such as right, left and the like are used with respect to a driver's position of the vehicle.

As shown, a steering system comprises a steering wheel 1, a column shaft 2, a universal joint 3, an intermediate shaft 4, another universal joint 5, a torque sensor 6, a pinion 7 and a rack 8.

Rack 8 is provided with a piston 10 that is operatively disposed in a cylinder 9. Opposed ends of cylinder 9 are sealed with respective guide seals 11 and 12, so that cylinder 9 has two or right and left power cylinder chambers 13 and 14 that are bounded by piston 10. Piston 10 and the two power cylinder chambers 13 and 14 function to assist a driver of the vehicle by providing a major force required to direct or steer steered road wheels 17.

A torque (or steering torque) applied to steering wheel 1 by the driver is sensed by torque sensor 6 through column shaft 2, universal joint 3, intermediate shaft 4 and another universal joint 5. Upon receiving the torque, torque sensor 6 provides a control unit 33 with a corresponding torque signal through a torque sensor harness 34. The steering torque is transmitted to pinion 7 and forms part of a force needed for moving rack 8 in one and the other directions.

Denoted by numeral 32 is a motor electrical degree sensor that senses an electrical degree (or electrical angle) of a brushless motor 31. Upon sensing the electric degree, the motor electrical degree sensor 32 provides control unit 33 with a corresponding electrical degree signal through a motor electric degree sensor harness 35.

In control unit 33, based on both the torque signal from torque sensor 6 and a vehicle speed signal sensed by a vehicle speed sensor 38, there are calculated a current to be applied to brushless motor 31 and a direction (viz., turning direction) in which steered road wheels 17 are to be turned. Furthermore, based on the electrical degree signal from motor electrical degree sensor 32, computation needed for controlling brushless motor 31 is carried out, so that an electric power needed for controlling motor 31 is fed from a battery 40.

Motor 31 functions to drive a two-way pump 20 by an electric power provided by control unit 33.

Upon right steering of steering wheel 1, a working fluid (or oil) in left power cylinder chamber 14 is led through a left piping 19 to two-way pump 20 and compressed by the same, and the compressed working fluid is led through a right piping 18 to right power cylinder chamber 13. Due to the suction operation of two-way pump 20, the hydraulic pressure in left power cylinder chamber 14 is reduced thereby to produce a pressure difference between an interior of a reservoir tank 23 (which shows atmospheric pressure) and left power cylinder chamber 14, so that a left check valve 22 is opened causing the working fluid to flow from reservoir tank 23 to right power cylinder chamber 13 while being sucked and compressed by two-way pump 20. The hydraulic pressure in right power cylinder chamber 13 is thus increased thereby to produce a pressure difference between the two power cylinder chambers 13 and 14, so that piston 10 is moved toward left power cylinder chamber 14 (or rightward in FIG. 1). That is, with this movement of piston 10, a hydraulic assist force is produced. With the hydraulic assist force thus produced and a thrust produced based on the steering torque, the steered road wheels 17 are steered right through ball joints 15 and tie rods 16.

The hydraulic pressure compressed by two-way pump 20 is forced to flow in a pilot passage 26 and actuates a left switching valve 25 thereby to connect left piping 19 to a drain passage 28.

When, then, the steering direction changes from the right to the left, the working fluid in right power cylinder chamber 13 is compressed by piston 10 and led into left power cylinder chamber 14 through two-way pump 20 and left piping 19. In this case, left switching valve 25 keeps the connection between left piping 19 and drain passage 28. Thus, in this case, an amount of the working fluid that is used for compressing right power cylinder chamber 13 excluding an amount of the fluid that is needed for setting a back pressure of left power cylinder chamber 14 is discharged to reservoir tank 23 by opening a back pressure valve 29. When the left steering is kept, the compressed working fluid in right power cylinder chamber 13 is kept led to left power cylinder chamber 14 by two-way pump 20 thereby reducing the hydraulic pressure in right power cylinder chamber 13 and reducing the pressure in pilot passage 26, and finally, left switching valve 25 is turned to shut the connection between left piping 19 and drain passage 28.

After the connection between left piping 19 and drain passage 28 is shut by left switching valve 25, the hydraulic pressure of left power cylinder chamber 14 is increased, and when there is produced a pressure difference between right power cylinder chamber 13 of which hydraulic pressure has been reduced by the fluid suction by two-way pump 20 and reservoir tank 23 that shows atmospheric pressure, a right suction check valve 21 is opened and thus thereafter the working fluid is sucked to be led to right power cylinder chamber 13. The hydraulic pressure in left power cylinder chamber 14 to which the hydraulic fluid is led by two-way pump 20 is increased thereby to produce a pressure difference between the chamber 14 and right power cylinder 13, which moves piston 10 to produce the hydraulic assist force. With the hydraulic assist force and the thrust produced based on the steering torque, the steered road wheels 17 are steered left through ball joints 15 and tie rods 16.

Denoted by numeral 41 is an ON/OFF valve that is of a normally open electromagnetic valve. That is, under the steering assist control, ON/OFF valve 41 is kept closed by an instruction signal from control unit 33. However, when an abnormal condition of the system is detected by control unit 33, the unit 33 stops the steering assist and stops feeding of the instruction signal to ON/OFF valve 41. When an abnormal condition occurs during a right steering, the hydraulic fluid in left power cylinder chamber 14 is pushed out by piston 10 and discharged to reservoir tank 23 through left piping 19, left check valve 43 and ON/OFF valve 41. While, when the abnormal condition occurs during a left steering, the hydraulic fluid in right power cylinder chamber 13 is pushed out by piston 10 and discharged to reservoir tank 23 through right piping 18, right check valve 42 and ON/OFF valve 41.

In the following, control unit 33 will be described in detail with reference to the drawings.

Figure 2:
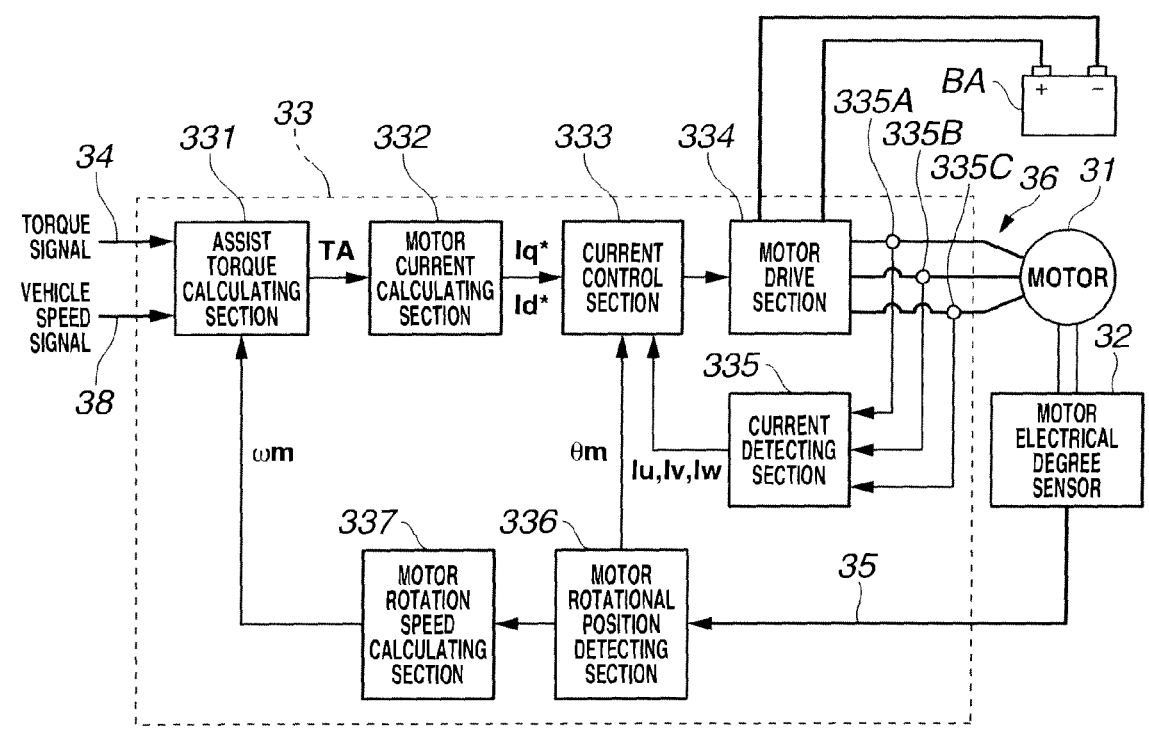
FIG. 2 is a block diagram of a control unit employed in the first embodiment of the present invention.

FIG. 2 is a block diagram that shows a construction of control unit 33.

An assist torque calculating section 331 calculates a basic assist torque of the brushless motor 31 based on a torque representing signal (or torque signal) 34 and a vehicle speed representing signal (or vehicle speed signal) 38 with reference to a previously prepared assist torque map. To or from the calculated basic assist torque, there is added or subtracted a delay compensating torque and/or a corrected torque prepared based on a motor speed "ωm" that is calculated by a motor rotation speed calculating section 337, thereby to provide a total assist torque for outputting an assist torque "TA".

At a motor current calculating section 332, there are calculated both a q-axle target current "Iq*" and a d-axle target current "Id*" of the motor 31 based on the assist torque "TA".

At a current control section 333, a PID control is carried out based on deviations between the above-mentioned q-axle target current "Iq*" and d-axle target current "Id*" and a q-axle current and a d-axle current. The q-axle current and d-axle current are provided by subjecting three phase real currents "Iu, Iv, Iw", which are detected at a current detecting section 335, to "3→2 phase transformation" with respect to an electrical angle "θm" of brushless motor 31 detected by a motor rotational position detecting section 336. With the PID control, a motor control amount is calculated and the calculated amount is subjected to "3→2 phase transformation" to provide PMW drive duties for U,V and W phases.

At a motor drive section 334, predetermined switching elements (not shown) are driven based on the PMW drive duties for U,V and W phases, so that a suitably controlled current (or electric power) is fed to brushless motor 31 from a battery "BA" to drive the motor 31.

At current detecting section 335, the currents of U, V and W phases fed to brushless motor 31 are detected by current sensors 335A, 335B and 335C and the detected currents are subjected to suitable amplification and calculation processes to output the three phase real currents "Iu, Iv, Iw" as motor real currents.

At motor rotational position detecting section 336, the electrical angle "θm" of brushless motor 31 is calculated based on information signals that are led thereto from motor electrical degree sensor 32 through motor electric degree sensor harness 35.

At motor rotation speed calculation section 337, a mechanical angle is calculated based on the electrical angle "θm" of brushless motor 31, and the motor speed "ωm" is calculated with reference to a time-variation of the mechanical angle.

[Diagnosis in the same Microcomputer]

In the following, a diagnosis in the same microcomputer will be described with the aid of FIG. 3.

Figure 3:
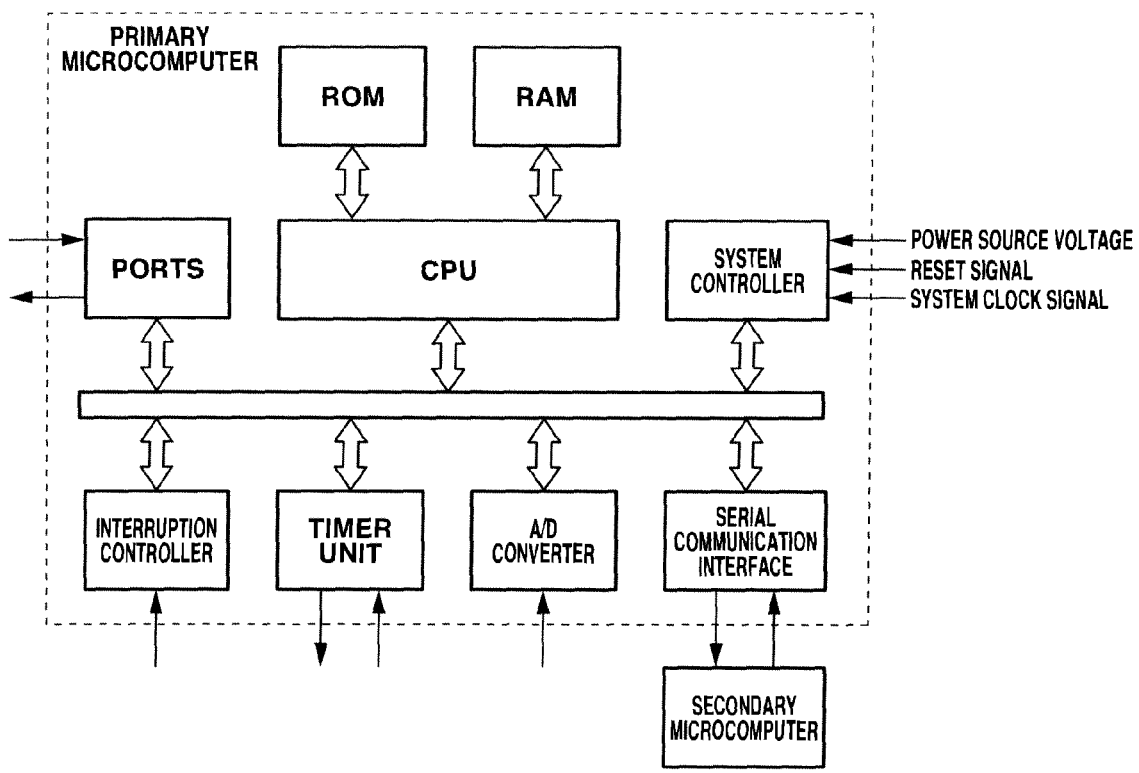
FIG. 3 is a block diagram of a primary microcomputer employed in the first embodiment of the present invention.

FIG. 3 is a block diagram of a microcomputer employed in control unit 33. As shown, the microcomputer comprises generally a CPU that interprets and executes instructions, a ROM that has a program written thereon and a RAM that is a main memory. The microcomputer further has ports through which various data are inputted or outputted, an interruption controller, a timer unit, an A-D (analog to digital) converter, a serial communication interface, an electric power source and a system controller to which a reset signal and a system clock signal are inputted. The ROM stores therein both a control program data that are arranged in "m-by-n matrix form" and a diagnosing data that are arranged in "m-by-n matrix form".

In the following, explanation will be directed to an arrangement in which two (viz., primary and secondary) microcomputers of the above-mentioned type are used for diagnosing an abnormality by using communication therebetween. Usually, the primary microcomputer effects a communication with the secondary microcomputer through a serial communication interface. In case of effecting a data transmitting/receiving through the serial communication interface, the commonly-used baud rate (viz., communication speed) is 32 to 128 kbps. If the baud rate excessively increases, reliability of the data is deteriorated. If the communication data is constructed to have a 2 byte (8+8 bit) data+SUM value data 1 byte (8 bit) and start bit and stop bit of a transmission data are of 1 bit type and there is no parity bit, the number of bits of all data that are transmitted from the secondary microcomputer to the primary microcomputer or from the primary microcomputer to the secondary microcomputer is 30 (=8 bit data+start bit+stop bit)×b byte). Theoretically, the time needed for the transmission is represented by "number of bits/baud rate". Accordingly, if the baud rate is 32, 64 or 128 kbps, the needed transmission time is 916, 458 or 229 μsec. However, actually, the needed transmission time is somewhat increased due to existence of actions for completion of data transmission and receiving.

Accordingly, in a first embodiment of the present invention, the diagnosing of abnormality is carried out in one microcomputer. More specifically, a control program data is written in a certain zone of ROM of the microcomputer and the completely same program is written in another zone of ROM as a diagnosing data. By a data abnormality diagnosing section that is a program and written in ROM at a position other than the position of the above-mentioned control program data, data of control program and data of the abnormality diagnosing program are compared to carry out an abnormality diagnosis of the data of the control program.

In the storage zone of the control program data, electrical ON/OFF signals are arranged like a grid. If some irregularity is applied to the storage zone, a so-called ON/OFF inversion tends to occur in a limited part of the storage zone or one column or one row tends to show only ON or OFF.

It is to be noted that it is almost zero (or impossible) that the completely same two control program data (viz., diagnosing data) stored in physically different zones show abnormality at the same time. Accordingly, by comparing the two control program data, the data abnormality can be diagnosed.

Usually, the microcomputer used for controlling an electric power steering device is of a RISC type that carries out the following five states IF, ID, EX, MA and WB through five stage pipe lines. That is, IF represents "Instruction fetch" (reading of instructions), ID represent "Instruction decoding" (decoding of instructions), EX represents "Execution of Instructions" (calculation of four fundamental rules, address calculation, etc.,), MA represents "Memory Access" (which is carried out when a memory access occurs at the stage "EX", and WB represents "Write back" (the results of the stage "MA" are rewritten in a resister of CPU).

Usually, in the above-mentioned RISC type microcomputer, each instruction is executed by one dock. However, if the instruction has a memory access, each of the stages IF and MA needs 2 or 3 docks. Accordingly, in order to meet the worst condition in which execution of one instruction needs nine docks, the CPU used should be of a type that has a clock frequency of 0.9 μsec (=9 clocks/10 Mhz). This means a super high speed transmission that is 254 times as fast as when the data is received through a communication (baud rate is 128 kbps). Furthermore, due to nonuse of communication wires or lines, the reliability of data is assuredly kept.

[Process for Diagnosing Abnormality of Data]

In the following, a process for diagnosing abnormality of the data will be described with the aid of FIG. 4.

Figure 4:
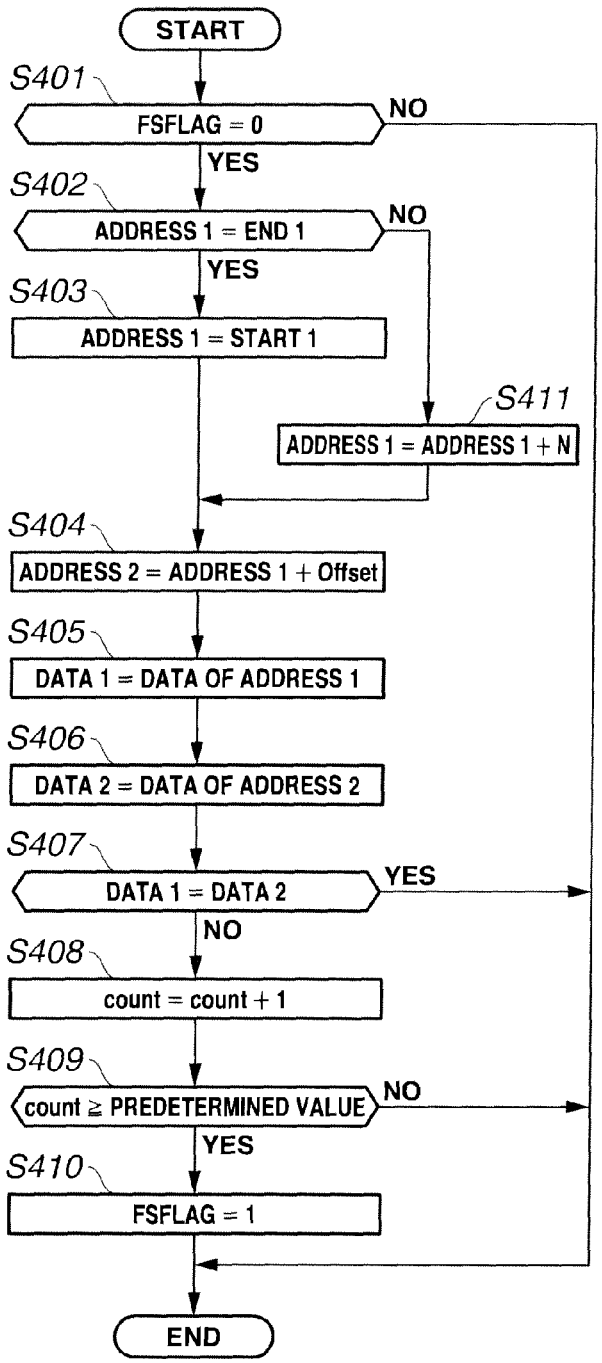
FIG. 4 is a flowchart showing operation steps (or progress) executed in sequence in the control unit employed in the first embodiment for establishing a data abnormality diagnosing process.
Figure 4:
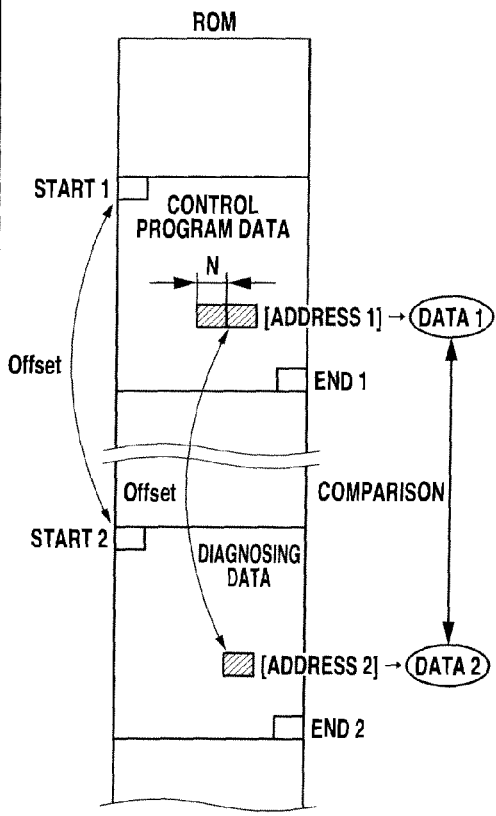

FIG. 4 is a flowchart depicting the data abnormality diagnosing process in a first embodiment of the present invention. Beside the flowchart, there is shown a diagram showing an image of the data diagnosis. In the diagram, a control program data is written at an upper part (viz., a control program data storage zone) and a data to be diagnosed is written at a lower part (viz., a diagnosis data storage zone). That is, at the lower part, a machine code that is the same as that of the control program data is written. The machine code is used for checking the control program data. It is to be noted that a data abnormality diagnosing program (in a data abnormality diagnosing section) is stored or written in a storage zone that is different from the control program data storage zone and the diagnosing data storage zone and constantly executed in a control cycle provided by control unit 33.

At step S401, judgment is carried out as to whether an abnormality firm flag "FSFLAG" is 0 (zero) or 1 (one), that is, FSFLAG=0 or 1. If 0 (zero), the operation flow goes to step S402 judging that the abnormality has not been firmed. While, if 1, the operation flow goes to END judging that the abnormality has been firmed.

At step S402, judgment is carried out as to whether an ADRESS1 indicates an end END1 of the control program data or not. If YES, the operation flow goes to step S403. While, if NO, the operation flow goes to step S411.

At step S403, a start address START1 of the control program data is substituted for the ADRESS1, and the operation flow goes to step S404.

At step S404, an offset value is added to the ADRESS1 to provide an ADRESS2, and the operation flow goes to step S405. It is to be noted that the offset value is an amount of deviation between the control program data and a start address START2 of a diagnosing program that stores in the ROM the diagnosing data to which mapping of the same machine code as that of the control program data for diagnosing an abnormality of the control program data has been made.

At step S405, the data of the ADRESS1 is substituted for a data1, and the operation flow goes to step S406.

At step S406, the data of the ADRESS2 is substituted for a data2, and the operation flow goes to step S407.

At step S407, judgment is carried out as to whether the data1 is equal to the data2. If NO, that is, if the data1 is not equal to the data2, the operation flow goes to step S408. While if YES, that is, if the data1 is equal to the data2, the operation flow goes to END.

At step S408, a counter (abnormality counter) is incremented by one to provide a count, and the operation flow goes to step S409.

At step S409, judgment is carried out as to whether or not the count is equal to or larger than a predetermined value. If YES, that is, if the count is equal to or larger than the predetermined value, the operation flow goes to step S410. While, if NO, that is, if the count is smaller than the predetermined value, the operation flow goes to END.

At step S410, the abnormality firm flag "FSFLAG" is set to 1 (one) and process is ended.

At step S411, N is added to the ADRESS1 to provide an updated ADRESS1. N may be of a type having a data size with 8 bit, 16 bit, 32 bit or so.

As is described hereinabove, the first embodiment of the invention is a diagnosing system installed in a control unit 33 of an electric power steering device mounted on a wheeled motor vehicle. The diagnosing system comprises a control program data for controlling the power steering device and a microcomputer that installs therein an integrated circuit for storing and processing data. The microcomputer further installs therein a control program data storage section that stores the control program data, a diagnosing data storage section that stores a diagnosing data that is the same as the data of the control program and an abnormal data diagnosing section that, by comparing the control program data and the diagnosing data, detects abnormality of the control program data.

In the followings, advantages of the first embodiment will be described.

(1) In the same microcomputer, the comparison between the data of the control program and the diagnosing data is carried out, and thus, the diagnosing time can be reduced and the reliability of the diagnosis can be increased.

(2) In the data abnormality diagnosing section, when abnormality of the control program data is detected, time counting is carried out every given time by a time counter, and when the abnormality of the control program data is solved, the counted time is cleared, and when the counted time shows a given time, the abnormality of the control program data is determined firm. Thus, accuracy of the abnormality diagnosis can be increased.

(3) The power steering device is provided with an electric motor 31 that provides the steered road wheels with a steering force, and the electric motor is controlled by a control device. Thus, the power steering device can enjoy a high diagnosis responsibility.

In the following, a diagnosing system of a second embodiment of the present invention will be described with reference to FIG. 5.

Figure 5:
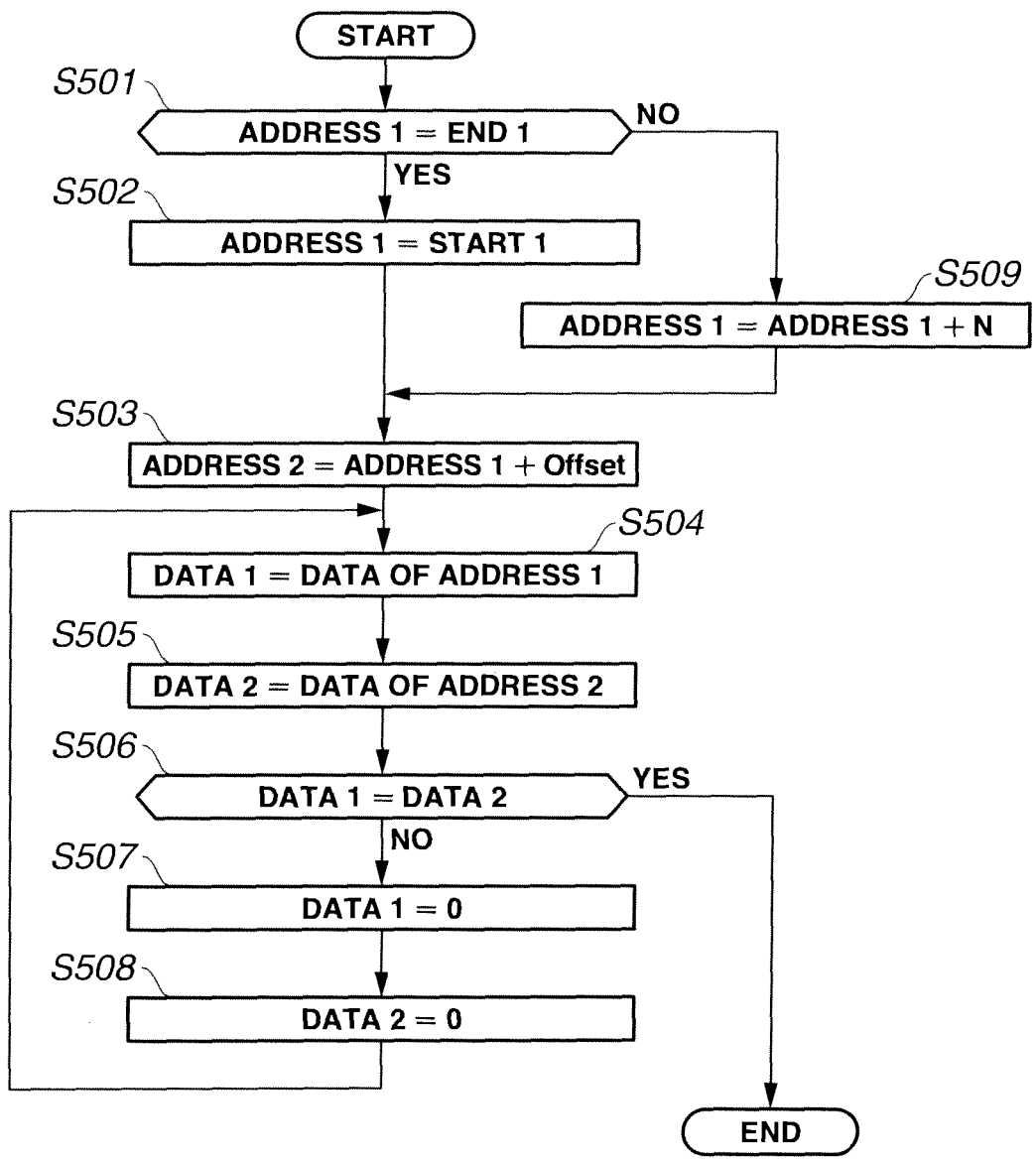
FIG. 5 is a flowchart similar to FIG. 4, but showing operation steps executed in a control unit employed in a second embodiment of the present invention for establishing a data abnormality diagnosing process.

FIG. 5 is a flowchart depicting operation steps executed in a control unit employed in the second embodiment of the present invention.

[Abnormality Diagnosing Process by Repetition]

If, under data abnormality diagnosing process, an abnormality of the data is detected, only the abnormal data is diagnosed over and over. This process is depicted by the flowchart of FIG. 5.

At step S501, judgment is carried out as to whether an ADRESS1 indicates an end END1 of the control program data or not. If YES, the operation flow goes to step S502. While, if NO, the operation flow goes to step S509.

At step S502, a start address START1 of the control program data is substituted for the ADRESS1, and the operation flow goes to step S503.

At step S503, an offset value is added to the ADRESS1 to provide an ADRESS2, and the operation flow goes to step S504. It is to be noted that the offset value is an amount of deviation between the control program data and a start address START2 of a diagnosing program that stores in the ROM the diagnosing data to which mapping of the same machine code as that of the control program data for diagnosing an abnormality of the control program data has been made.

At step S504, the data of the ADRESS1 is substituted for a data1, and the operation flow goes to step S505.

At step S505, the data of the ADRESS2 is substituted for a data2, and the operation flow goes to step S506.

At step S506, judgment is carried out as to whether the data1 is equal to the data2. If NO, that is, if the data1 is not equal to the data2, the operation flow goes to step S507. While, if YES, that is, if the data1 is equal to the data2, the operation flow goes to END.

At step S507, the data1 is cleared to 0 (zero), and the operation flow goes to step S508.

At step S508, the data2 is cleared to 0 (zero), and the operation flow goes up to step S504 to carry out diagnosis of abnormality of the data of the same address. By this repeated process, a so-called program run pulse "PRUN-signal", which indicates a running condition of the program, becomes fixed to a High or Low value when an abnormality occurs in the microcomputer.

At step S509, N is added to the ADRESS1 to provide an updated ADRESS1, the operation flow goes to step S503. N may be of a type having a data size with 8 bit, 16 bit, 32 bit or so.

In the second embodiment, in addition to the above-mentioned advantages (1) and (3) of the first embodiment, the following advantages are given.

(4) When abnormality of the control program data is sensed by the data abnormality diagnosing section, only the abnormal data detected is checked or diagnosed over and over with reference to the diagnosing data.

Accordingly, much high accurate detection of the abnormality is carried out in a shortened time. In other words, it is unnecessary to verify the control program data to the end of the same. If desired, an abnormality counter may be used like in case of the above-mentioned first embodiment. That is, if the repletion number arrives at a predetermined number, abnormality is judged.

In the following, a diagnosing system of a third embodiment of the present invention will be described with reference to FIG. 6.

In the third embodiment, by copying the control program data written on the ROM onto the RAM, there is provided a diagnosis data storage zone. While, in the above-mentioned first embodiment, both the control program data and the diagnosing data are stored in the ROM.

Figure 6:
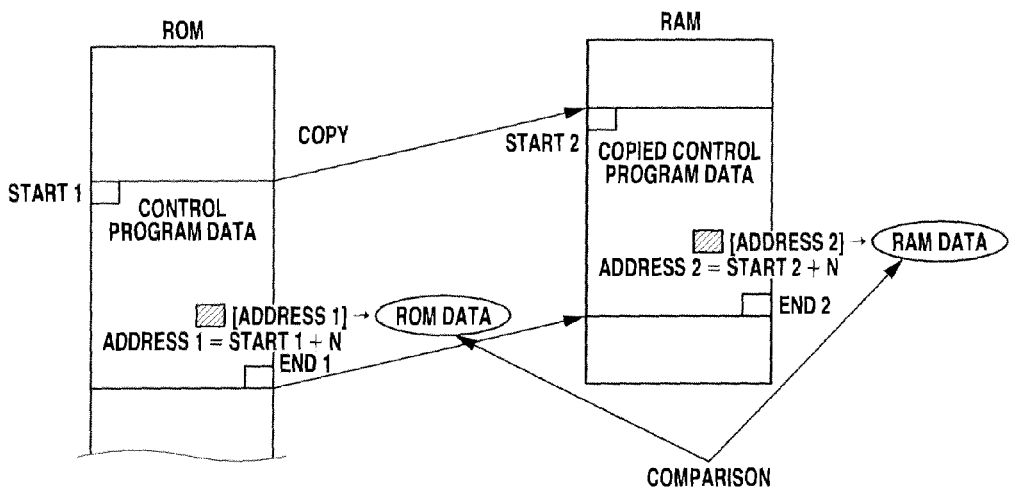
FIG. 6 is a flowchart showing operation steps executed in a control unit employed in a third embodiment of the present invention for establishing a data copying process from ROM to RAM.
Figure 6:
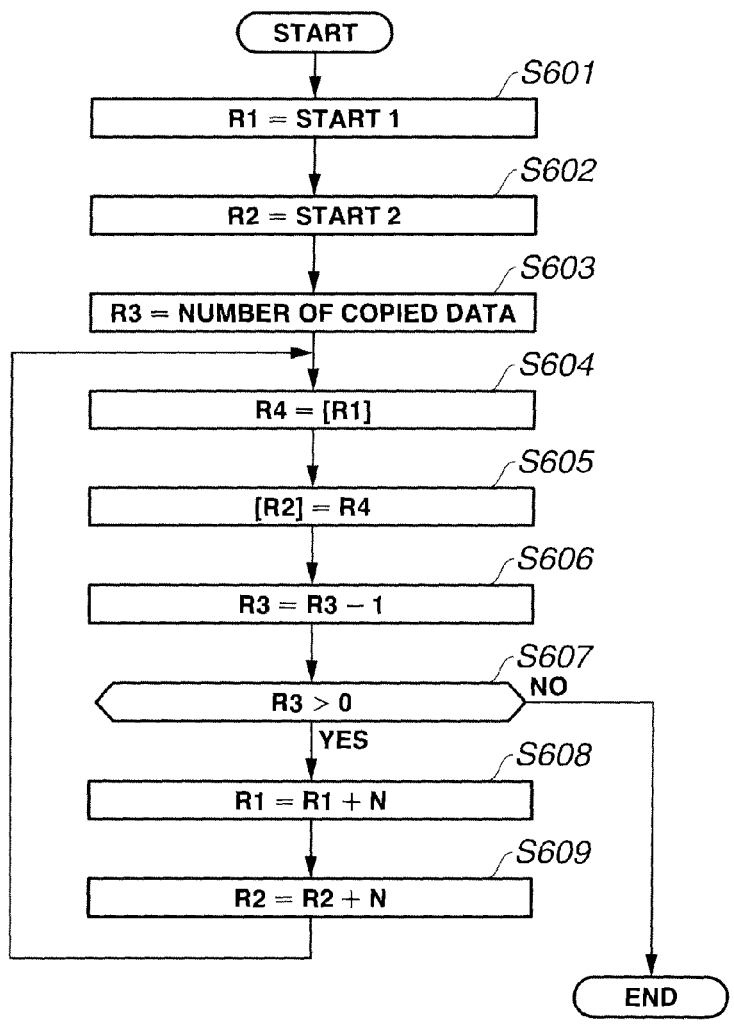

FIG. 6 is a flowchart depicting operation steps executed in a control unit employed in the third embodiment of the present invention.

[Process for Copying Control Program Data on ROM to RAM]

This process is carried out once when the microcomputer is reset.

At step S601, there is set on a register R1 a control program data start address START1 of ROM, and the operation flow goes to step S602.

At step S602, there is set on a register R2 a copy target address start address START2 of RAM, and the operation flow goes to step S603.

At step S603, there is set on a register R3 a number of data of the control program of ROM that are to be copied on RAM, and the operation flow goes to step S604. The number of data depends on the size of the data that are handled by the microcomputer. That is, if, for example, the control program data has a size of 32 kbytes (actually 32768 bytes), the program is represented by byte size N=0x8000, word size N=0x4000 and double word N=0x2000 in a sixteen number notation.

At step S604, by register indirect addressing, the ROM data is read from the address indicated by the register R1, and the ROM data is substituted for a register R4, and the operation flow goes to step S605.

At step S605, via resistor indirect addressing, the ROM data stored in the register R4 is written to the RAM indicated by the register R2, and the operation flow goes to step S606.

At step S606, one decrement is carried out from the register R3, and the operation flow goes to step S607.

At step S607, judgment is carried out as to whether the register R3 is larger than 0 (zero) or not. If YES, the operation flow goes to step S608, and if NO, the operation flow goes to END.

At step S608, the address of the ROM of which data is copied is advanced by N. N depends on the size of the data that is handled by the microcomputer. That is, byte=1, word=2 and double word=4 are established.

At step S609, the address of the RAM to which the data of the ROM is copied is advanced by N, and the operation flow goes back to step S604 for the next data copying.

[Data Abnormality Diagnosing Process]

Figure 7:
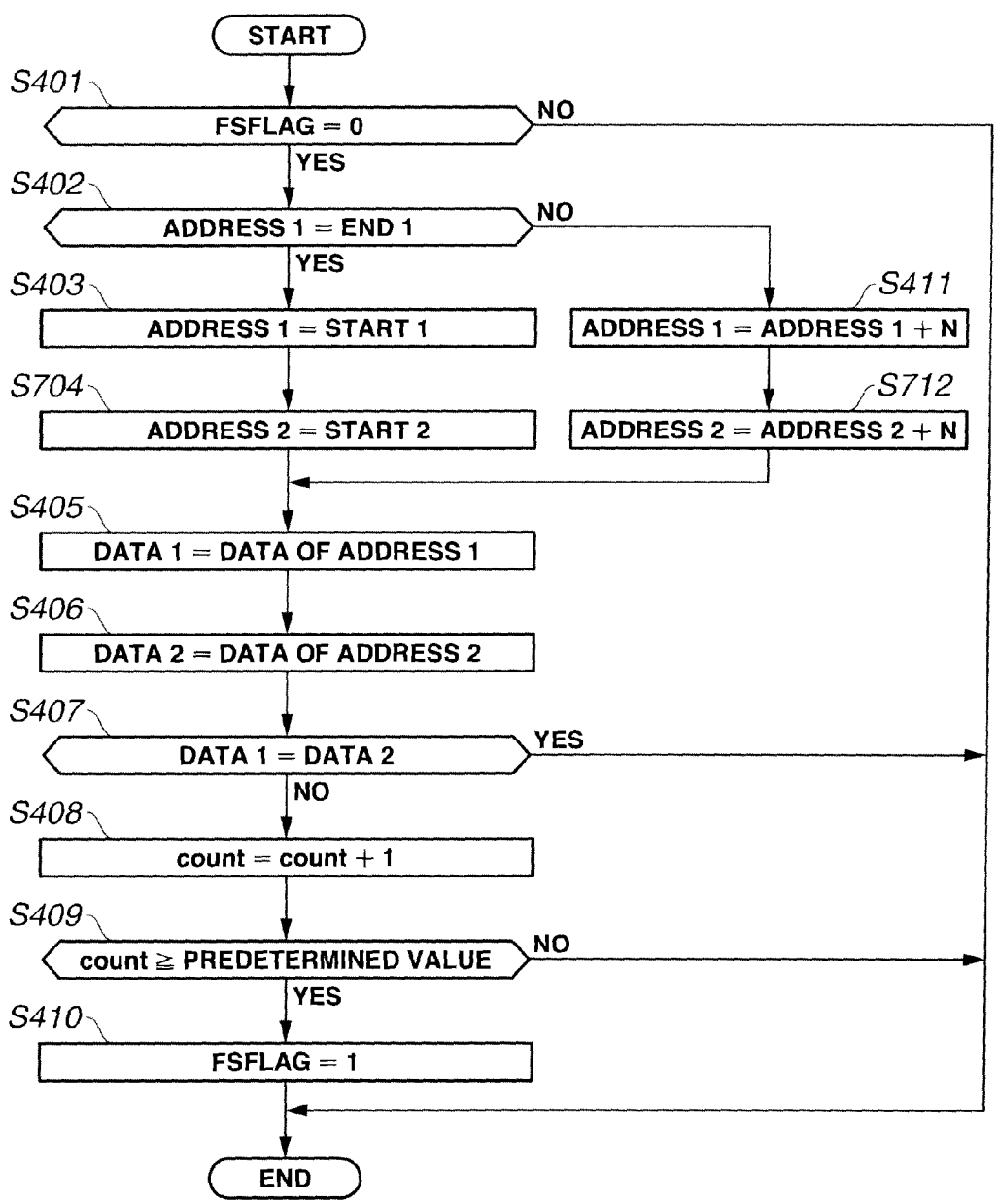
FIG. 7 is a flowchart similar to FIG. 4, but showing operation steps executed in the control unit of the third embodiment for establishing a data abnormality diagnosing process.

FIG. 7 is a flowchart depicting the operation steps executed by the control unit employed in the third embodiment for carrying out a data abnormality diagnosing process.

As shown, the flowchart of FIG. 7 is similar to that of FIG. 4 of the first embodiment, and thus, only steps that are different from those of FIG. 4 will be described in the following.

At step S704, a start address of RAM data START2 is substituted for the ADRESS2, and the operation flow goes to step S405.

At step S712, the adress2 is advanced by N. As has been mentioned hereinabove, N depends on the size of the data that is handled by the microcomputer. That is, byte=1, word=2 and double word=4 are established.

As is described hereinabove, in the third embodiment, in addition to the above-mentioned advantages (1), (2) and (3) of the first embodiment, the following advantage (5) is given.

(5) The microcomputer is equipped with RAM zone where data is rewritable, the diagnosing data storage section is provided in the RAM zone and the diagnosing data is the data that is provided by copying the control program data of ROM and putting the copied one onto the RAM zone. Thus, the diagnosing data storage section can be renewed as the need arises, and thus the diagnosing data storage section of the computer has a higher flexibility.

In the following, a diagnosing system of a fourth embodiment of the present invention will be described with reference to FIGS. 8 and 9.

Since the system of this fourth embodiment is similar to the system of above-mentioned first embodiment, only steps that are different from those of the first embodiment will be described. In the first embodiment, there is provided a diagnosing data storage section that stores data that has been provided by copying data in the control program storage zone of the ROM. While in the fourth embodiment, there is employed a data storage zone of control program data of which columns and rows are identical to those of the control program data written in the ROM (that is, the control program data is written at a position shifted upward or laterally relative to the control program data on the ROM). This will become much clearer from the following description.

Figure 8:
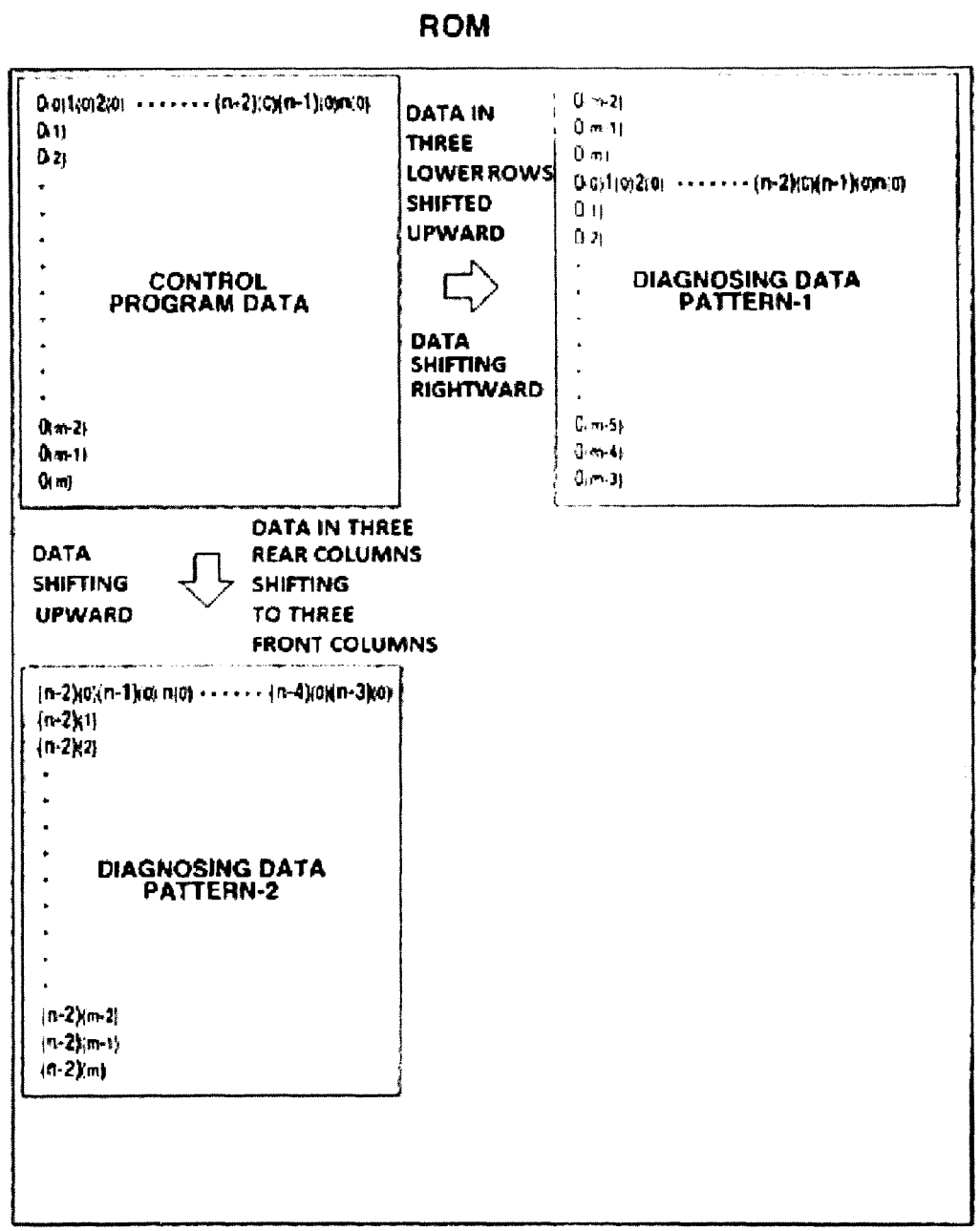
FIG. 8 is an illustration showing a condition of a ROM employed in a fourth embodiment of the present invention.

FIG. 8 is a drawing depicting a condition of the ROM employed in the fourth embodiment. In the drawing, designated by "DIAGNOSING DATA PATTERN-1," is a pattern of the data that is provided by shifting the basic control program data rightward (in the drawing) in the ROM with data in three lower rows of the basic control program data shifted upward. That is, a row rotation is made in this pattern. Also in the drawing, designated by "DIAGNOSING DATA PATTERN-2," is a pattern of the data that is provided by shifting the control program data upward in the ROM and shifting the data of three rear columns to three front columns. That is, a column rotation is made in this pattern.

As is known in the art, the storage zone of the ROM is in matrix form, and failures of the storage zone tend to appear for each column or row. Accordingly, if the data of the control program and those of the diagnosing program are arranged in the same arranging manner without making the above-mentioned column or row rotation, failure of one column or row of the control program data brings about the same value as that brought by the diagnosing data, which fails to find the failure.

Thus, as is mentioned hereinabove, by shifting or displacing the arrangement of the data, a so-called software bug is removed and thus accuracy of the abnormality detecting accuracy is increased.

[Data Abnormality Diagnosing Process]

Figure 9:
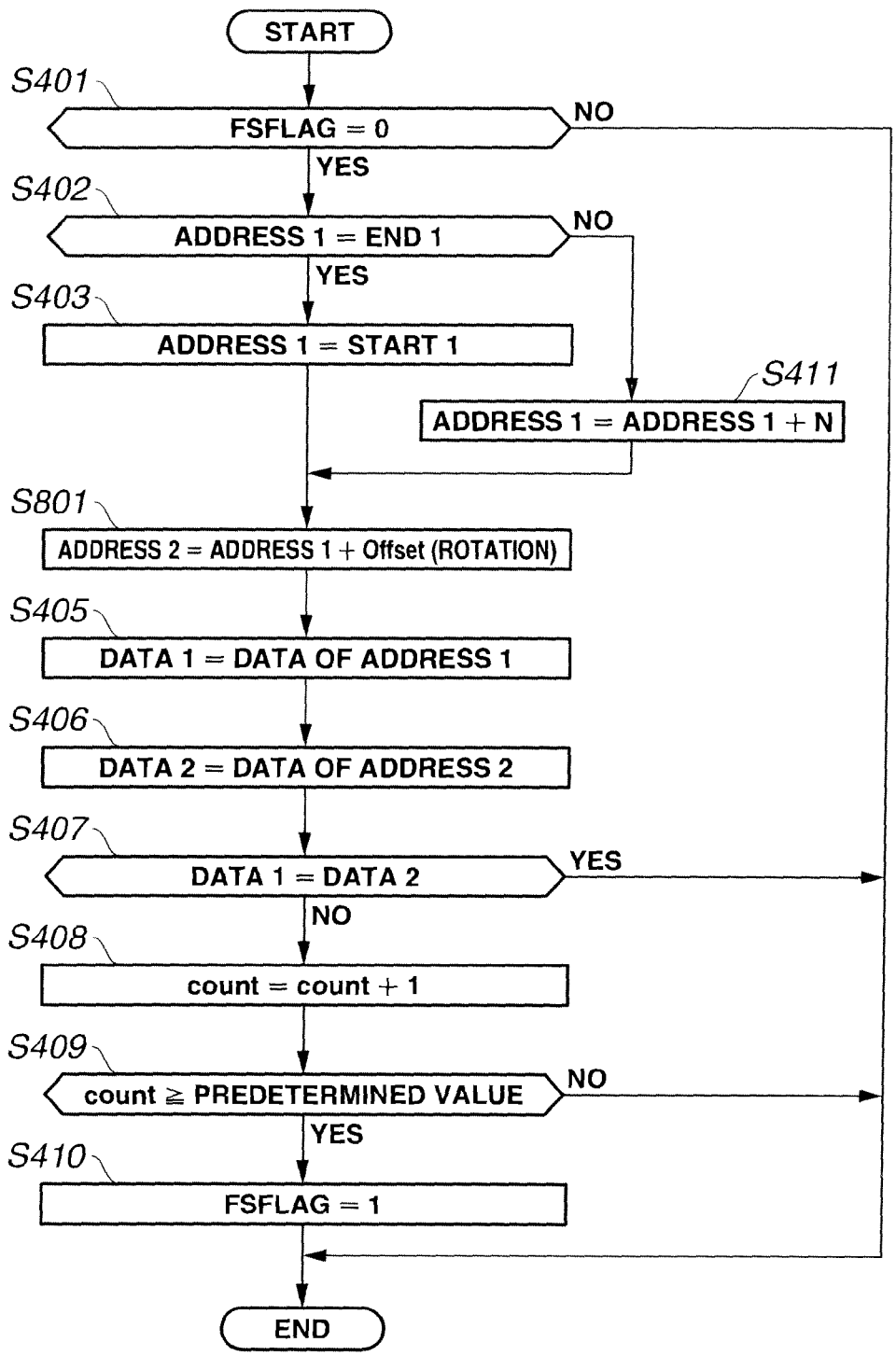
FIG. 9 is a flowchart similar to FIG. 4, but showing operation steps executed in a control unit of the fourth embodiment for establishing a data abnormality diagnosing process.

FIG. 9 is a flowchart depicting the operation steps executed by the control unit employed in the fourth embodiment for carrying out a data abnormality diagnosing process.

As shown, the flowchart is identical to that of FIG. 4 of the above-mentioned first embodiment except step S801. Thus, only the step S801 will be described in the following.

At step S801, an offset value modified by the abovementioned column or row rotation is added to the ADRESS1 to provide an ADRESS2. For example, in case of the DIAGNOSING DATA PATTERN-I, until the time when the ADRESS1 arrives at (m-3) row, the offset value keeps a value to which a value of the three rows is added, and when the ADRESS1 comes to (m-3), the offset value is added to the ADRESS1 to provide an ADRESS2 that corresponds to each of the rotations. In case of the DIAGNOSING DATA PATTERN-2, there is provided an ADRESS2 that corresponds to each of the other rotations.

In the above-mentioned fourth embodiment, the following advantage (6) is given.

(6) The ROM has the data storage zone that is in matrix form, the control program data storage zone stores the control program data that is arranged in m-by-n matrix form on the data storage zone, the diagnosing data storage zone stores the diagnosing data that is arranged in m-by-n matrix form on the data storage zone, the control program data and the diagnosing data are so arranged that columns or rows thereof make an arrangement on the data storage zone, and the diagnosing data is so arranged that the arrangement of the storage zone in m-by-n matrix form is different from that of the control program data. Accordingly, upon failure of the system, it never occurs that the two types of data that are to be compared with each other are equivalent, and thus, abnormality detection precision is much increased.

In the fourth embodiment, an example has been described hereinabove wherein the copied DIAGNOSING DATA PATTERN (viz., PATTERN-1 or PATTERN-2) is provided at a right or lower position of the ROM with respect to the control program data storage zone having columns or rows thereof overlapped with those of the control program data. However, if desired, the copied DIAGNOSING DATA PATTERN is provided at a right or lower position of the ROM having columns or rows thereof not overlapped with those of the control program data. Furthermore, if desired, copying of rows may be made from the top and copying of the columns may be made from the left in FIG. 8.

Figure 10:
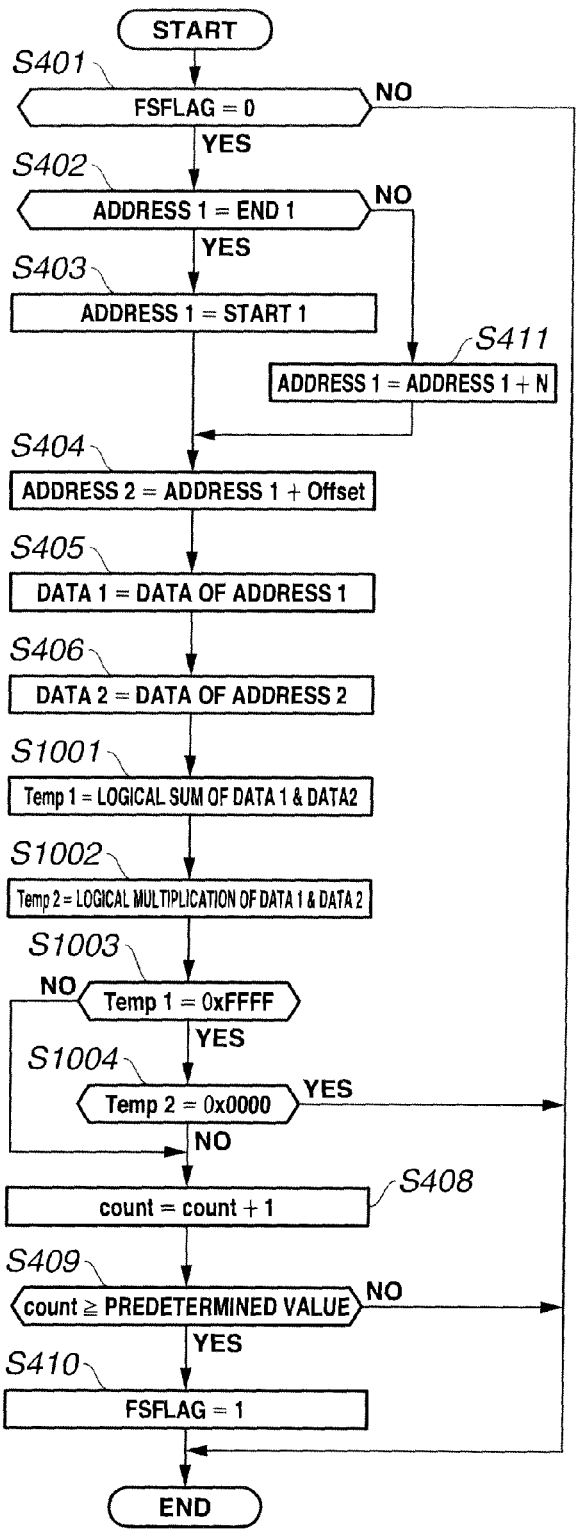
FIG. 10 is a flowchart similar to FIG. 4, but showing operation steps executed in a control unit of a fifth embodiment of the present invention for establishing a data abnormality diagnosing process.
Figure 10:
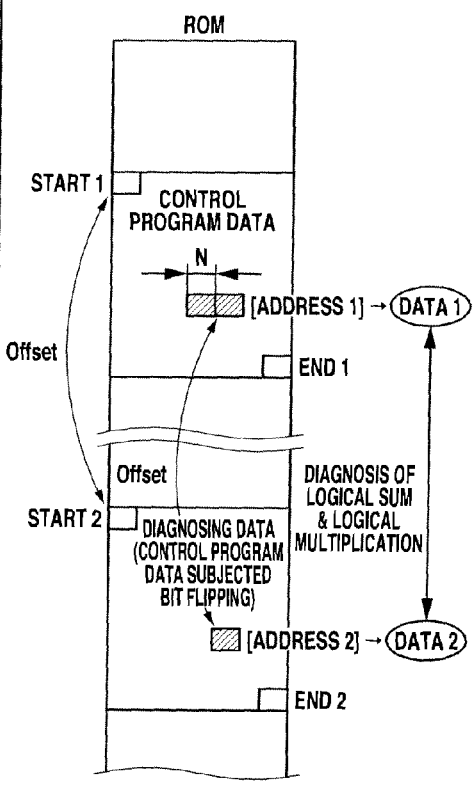

In the following, a diagnosing system of a fifth embodiment of the present invention will be described with reference to the flowchart of FIG. 10.

Since the contents of the flowchart are identical to those of the flowchart of FIG. 4 of the first embodiment except steps S1001 to S1004, only the steps S1001 to S1004 will be described in the following.

At step S1001, a logical sum (OR) of the data1 and data2 is provided and substituted for Temp1, and the operation flow goes to step S1002.

At step S1002, a logical multiplication (AND) of the data1 and data2 is provided and substituted for Tempt, and the operation flow goes to step S1003.

At step S1003, judgment is carried out as to whether the logical sum Temp1 is equal to 0xFFFF (in hexadecimal notation) or not. When the base data is of a type represented by 0110 1001 1010 0101 in binary, the same is represented by 1001 0110 0101 1010 when subjected to a bit flipping. The logical sum (OR) of these two values is represented by 1111 1111 1111 1111, and the same is represented by 0xFFFF in hexadecimal notation. If at step S1003, "Temp1=0xFFFF" (or YES) is judged, the operation flow goes to step S1004, if NO, the operation flow goes to step S408.

In this embodiment, the data size is set to 16 bit and thus the data is represented by 0xFFFF. Thus, if the data size is 8 bit, the data will be represented by 0xFF and if the data size is 32 bit, the data will be represented by 0xFFFFFFFF.

At step S1004, judgment is carried out as to whether Temp2 is equal to 0x0000 or not. When the base data is of a type represented by 0110 1001 1010 0101 in binary, the same is represented by 1001 0110 0101 1010 when subjected to a bit flipping. The logical multiplication (AND) of these two values is represented by 0000 0000 0000 0000. If YES, that is, if Temp2=0x0000 is judged, the operation flow goes to END, while if NO, the operation flow goes to S408.

In the fifth embodiment of the present invention, the following advantages (7) and (8) are given.

(7) The control unit 33 of the electric power steering device is provided with a memory diagnosing device that includes a microcomputer. In the microcomputer, there are arranged a control program data storage zone that stores a control program data for the power steering device, a diagnosing data storage zone that stores a diagnosing data that is provided by subjecting the control program data to a bit flipping, and a data abnormality diagnosing section that detects abnormality of the control program data by comparing the control program data with the diagnosing data. That is, the comparison between the control program data and the diagnosing data is carried out in the same microcomputer, and thus, the diagnosing time can be reduced and the reliability of the diagnosis can be increased.

(8) The control program data and the diagnosing data are of a digital type that is represented by arrangement of 0 and 1. In order to carry out the data abnormality diagnosis, a logical sum (OR) and a logical multiplication (AND) of the two types of data of the control program and the diagnosing data are calculated and abnormality of the control program data is judged by carrying out whether or not the logical sum (OR) is all 1 and/or logical multiplication (AND) is all 0. This means easy diagnosis of the abnormality of the control program data.

In the following, a diagnosing system of a sixth embodiment of the present invention will be described with reference to the flowchart of FIG. 11.

This sixth embodiment is similar to the above-mentioned third embodiment. Thus, only steps different from those of the flowchart of FIG. 7 will be described in the following.

In the third embodiment, at the time of copying the control program data of the ROM to the RAM, the copying is directly made. While, in the sixth embodiment, the copying is carried out with respect to the data that has been subjected to a bit flipping, as will become much clear from the following explanation.

[Process for Copying Control Program Data on ROM to RAM]

First, the process for copying the control program data on the ROM to the RAM will be described. This process is carried out once when the microcomputer is reset.

Figure 11:
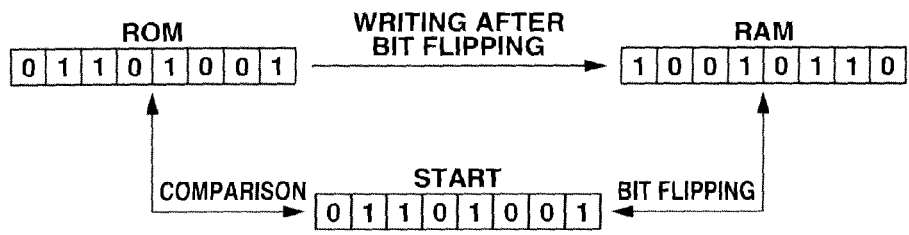
FIG. 11 is a flowchart showing operation steps executed in a control unit employed in a sixth embodiment of the present invention for establishing a data copying process from ROM to RAM.
Figure 11:
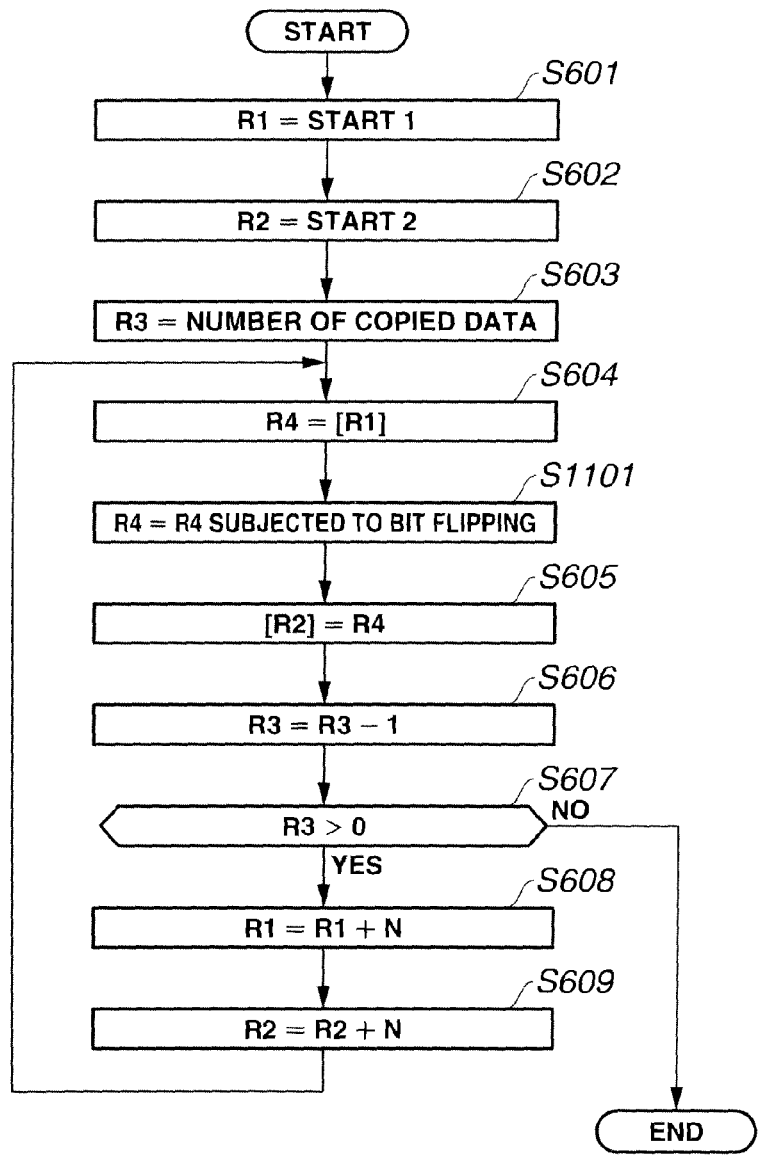

At step S1101 of the flowchart of FIG. 11, the data of the register R4 is subjected to a bit flipping, which is different from the case of the flowchart of FIG. 6 of the third embodiment.

[Data Abnormality Diagnosing Process]

Figure 12:
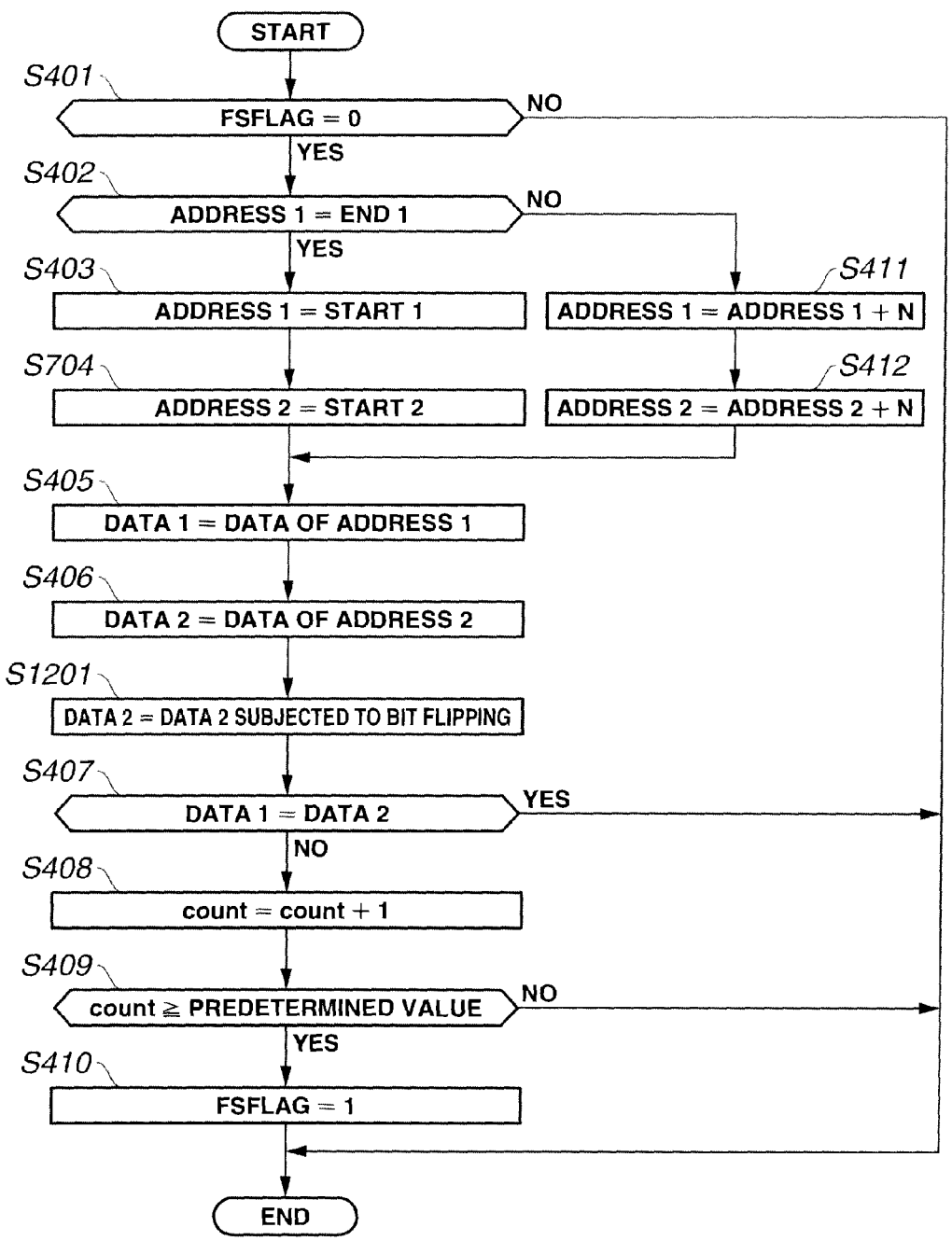
FIG. 12 is a flowchart similar to FIG. 4, but showing operation steps executed in the control unit of the sixth embodiment of the present invention for establishing a data abnormality diagnosing process.

FIG. 12 is a flowchart depicting operation steps for the data abnormality diagnosing process employed in the sixth embodiment. The contents of this flowchart are similar to those of the flowchart of FIG. 7 of the third embodiment.

That is, in the sixth embodiment, at step S1201, the data of the RAM is subjected to a bit flipping, which is different from the case of the flowchart of FIG. 7 of the third embodiment.

In the sixth embodiment, the above-mentioned advantages (2), (3), (5) and (7) are obtained.

In the following, a diagnosing system of a seventh embodiment of the present invention will be described with the aid of FIG. 13. Since the diagnosing system of the seventh embodiment is similar to the system of the first embodiment, only portions different from those of the first embodiment will be explained in the following. In the first embodiment, a control program data is written in a given zone of the ROM, and a copy of the control program data is written in another given zone of the ROM as a diagnosing data.

While, in the seventh embodiment, a data provided by subjecting the control program data to a function transformation is stored as a diagnosing data.

More specifically, a value provided by subjecting a data (data1) of the address of a control program data and a subsequent data (data3) to arithmetic and logic arithmetic is written as a diagnosing data (data2), and comparison between the control program data and the diagnosing data is carried out.

FIG. 13 is a flowchart depicting the data abnormality diagnosing process carried out in the seventh embodiment. Only steps different from those of the flowchart of FIG. 4 of the first embodiment will be described in the following.

At step S1307, N is added to the ADRESS1 to provide an ADRESS3, and the operation flow goes to step S1308.

At step S1308, the data of the ADRESS3 is read and substituted for a data3, and the operation flow goes to step S1309.

At step S1309, the data1 and data3 are added and substituted for Temp1. If desired, in stead of the addition operation, combination of various types of arithmetic may be used for providing Temp1. In this case, the result of the combination of the various types of arithmetic is held as the data2.

At step S1310, judgment is carried out as to whether Temp1 is equal to the data2 or not. If YES, the operation flow goes to END, and if NO, the operation flow goes to step S408.

In the seventh embodiment, the following advantage (9) is given in addition to the above-mentioned advantages (2) and (3).

(9) In the microcomputer, there are arranged a control program data storage zone that stores a control program data for the power steering device, a diagnosing data storage zone that stores a diagnosing data that is provided by subjecting the control program data to a function transformation, and a data abnormality diagnosing section that detects abnormality of the control program data by comparing the control program data with the diagnosing data. That is, the comparison between the control program data and the diagnosing data is carried out in the same microcomputer, which brings about reduction in diagnosing time and increase in reliability of the diagnosis.

In the following, modifications of the present invention will be described. A vehicle-mounted equipment mentioned in the description of the modifications means, in addition to the above-mentioned power steering device, an anti-lock brake system, a vehicle dynamic control system, an engine control system or an automatic transmission control system. Furthermore, a chip mentioned in the description of the modifications means a whole of integrated circuits through which data receiving/transmitting is carried out without the aid of communication interfaces. Accordingly, the abnormality diagnosis indicates an abnormality diagnosis between the ROM and RAN as well as an abnormality in the ROM.

(A1) A first modification is a memory diagnosing system for a control device of a vehicle-mounted equipment. The memory diagnosing system comprises a chip of integrated circuit that stores a control program data and a data for controlling the vehicle-mounted equipment, a control program data storage zone that is arranged in the chip and stores the control program data for controlling the vehicle-mounted equipment, a diagnosing data storage zone that is arranged in the chip and stores a diagnosing data identical to the control program data, and a data abnormality diagnosing section that is arranged in the chip to detect abnormality of the control program data by comparing the control program data with the diagnosing data. In this modification, the control program data and the diagnosing data are compared in the same chip, and thus a diagnosing time is reduced and a reliability of the diagnosis is increased.

(A2) The data abnormality diagnosing section of the modification (A1) may have the following feature. That is, when an abnormality of the control program data is sensed, only given data that has an abnormality is repeatedly compared with the diagnosing data for the decision of the abnormality of the control program data.

(A3) The data abnormality diagnosing section of the modification (A1) may have the following time counting-up section. That is, when the abnormality of the control program data is sensed, a time count-up is started and carried out every given time, and when the sensed abnormality of the control program data is dissolved, the count-up is reset, and when the count-up time value reaches a predetermined time value, the abnormality of the control program data is decided.

(A4) The chip of the modification (A1) may have a data storage zone that is in matrix form. The control program data storage zone is provided on the data storage zone and stores the control program data arranged in m-by-n matrix form, the diagnosing data storage zone is provided on the data storage zone and stores the diagnosing data arranged in m-by-n matrix form, either one of the control program data and the diagnosing data is so arranged that columns or rows of the control program data and columns or rows of the diagnosing data coincide on the data storage zone, and arrangement of the diagnosing data in m-by-n matrix form differs from that of the control program data. Due to displacement of the arrangement between the control program data and the diagnosing data, it never occurs that the two types of data that are to be compared are subjected to failure, and thus, the abnormality detecting accuracy is increased.

(A5) The chip of the modification (A1) may have a RAM section that is capable of rewriting the data stored therein. The diagnosing data storage zone is arranged on the RAM section and the diagnosing data is a copy of the control program data that has been written in the RAM section.

(A6) The vehicle-mounted equipment may be an electric power steering device that has an electric motor for providing steered road wheels of an associated motor vehicle with a steering force. The control device is constructed to control the electric motor.

(B1) A second modification is a memory diagnosing system for a control device of a vehicle-mounted equipment. The memory diagnosing system comprises a chip of integrated circuit that stores a control program data and a data for controlling the vehicle-mounted equipment, a control program data storage zone that is arranged in the chip and stores the control program data for controlling the vehicle-mounted equipment, a diagnosing data storage section that is arranged in the chip and stores a diagnosing data that has been provided by subjecting the control program data to a bit flipping, and a data abnormality diagnosing section that is arranged in the chip to detect abnormality of the control program data by comparing the control program data and with the diagnosing data. In this second modification, the control program data and the diagnosing data are compared in the same chip, and thus a diagnosing time is reduced and a reliability of the diagnosis is increased.

(B2) The data abnormality diagnosing section of the modification (B1) may have the following feature. That is, when an abnormality of the control program data is sensed, only given data that has an abnormality is repeatedly compared with the diagnosing data for the decision of the abnormality of the control program data.

(B3) The data abnormality diagnosing section of the modification (B1) may have the following feature. That is, after being subjected to the bit flipping, the diagnosing data is compared with the control program data for detecting the abnormality of the control program data.

(B4) The data abnormality diagnosing section of the modification (B1) may have the following feature. That is, each of the control program data and the diagnosing data is written by arrangements of data represented by a plurality of 0 (zero) and 1 (one). In the data abnormality diagnosing section, the logical sum (OR) and logical multiplication (AND) of the control program data and the diagnosing data are calculated and detection of abnormality of the control program data is effected by judging whether the calculated value shows 1 or not.

(B5) The chip of the modification (B1) may have a data storage zone that is in matrix form. The control program data storage zone is provided on the data storage zone and stores the control program data arranged in m-by-n matrix form, the diagnosing data storage zone is provided on the data storage zone and stores the diagnosing data arranged in m-by-n matrix form, either one of the control program data and the diagnosing data is so arranged that columns or rows of the control program data and columns or rows of the diagnosing data coincide on the data storage zone, and the arrangement in m-by-n matrix form of the diagnosing data differs from that of the control program data. Due to displacement of the arrangement between the control program data and the diagnosing data, it never occurs that the two types of data that are to be compared are subjected to failure, and thus, the abnormality detecting accuracy is increased.

(B6) The chip of the modification (B1) may have a RAM section that is capable of rewriting the data stored therein. The diagnosing data storage zone is arranged on the RAM section and the diagnosing data is a copy of the control program data that has been written in the RAM section.

(B7) The vehicle-mounted equipment may be an electric power steering device that has an electric motor for providing steered road wheels of an associated motor vehicle with a steering force. The control device is constructed to control the electric motor.

(C1) A third modification is a memory diagnosing system for a control device of a vehicle-mounted equipment. The memory diagnosing system comprises a chip of integrated circuit that stores a control program data and a data for controlling the vehicle-mounted equipment, a control program data storage zone that is arranged in the chip and stores the control program data for controlling the vehicle-mounted equipment, a diagnosing data storage zone that is arranged in the chip and stores a diagnosing data provided by subjecting the control program data to a function transformation, and a data abnormality diagnosing section that is arranged in the chip to detect abnormality of the control program data by comparing the control program data with the diagnosing data. In this modification, the control program data and the diagnosing data are compared in the same chip, and thus, a diagnosing time is reduced and a reliability of the diagnosis is increased.

(C2) The data abnormality diagnosing section of the modification (C1) may have the following feature. That is, when an abnormality of the control program data is sensed, only given data that has an abnormality is repeatedly compared with the diagnosing data for the decision of the abnormality of the control program data.

(C3) The data abnormality diagnosing section of the modification (C1) may have the following feature. That is, after being transformed to a value that is the same as the data of the control program, the diagnosing data is compared with the control program data for detecting the abnormality of the control program data.

(C4) The data abnormality diagnosing section of the modification (C1) may have the following feature. That is, after being subjected to a bit-flipping, the diagnosing data is compared with the control program data for detecting the abnormality of the control program data.

(C5) The data abnormality diagnosing section of the modification (C4) may have the following feature. That is, each of the control program data and the diagnosing data is written by arrangements of data represented by a plurality of 0 (zero) and 1 (one). In the data abnormality diagnosing section, logical sum (OR) and logical multiplication (AND) of the control program data and the diagnosing data are calculated and detection of abnormality of the control program data is effected by judging whether the calculated value shows 0 or 1.

(C6) The chip of the modification (C1) may have a data storage zone that is in the form of matrix. The control program data storage zone is provided on the data storage zone and stores the control program data arranged in m-by-n matrix form, the diagnosing data storage zone is provided on the data storage zone and stores the diagnosing data arranged in m-by-n matrix form, either one of the control program data and the diagnosing data is so arranged that columns or rows of the control program data and columns or rows of the diagnosing data coincide on the data storage zone, and arrangement of the diagnosing data in m-by-n matrix form differs from that of the control program data. Due to displacement of the arrangement between the control program data and the diagnosing data, it never occurs that the two types of data that are to be compared are subjected to failure, and thus, the abnormality detecting accuracy is increased.

(C7) The vehicle-mounted equipment of (C1) may be an electric power steering device that has an electric motor for providing steered road wheels of an associated motor vehicle with a steering force. The control device is constructed to control the electric motor.

The entire contents of Japanese Patent Application 2009-166653 filed Jul. 15, 2009 are incorporated herein by reference.

Although the invention has been described above with reference to embodiments of the invention and modifications of the embodiments, the invention is not limited to such embodiments and modification as described above. More various modifications and variations of such embodiments and modifications may be carried out by those skilled in the art, in light of the above description.

What is claimed is:

1. A diagnosing system for diagnosing a control device of a vehicle-mounted equipment, comprising:
    a chip having an integrated circuit that stores a control program data for controlling the vehicle-mounted equipment;
    a control program data storage zone that is arranged in the chip and stores the control program data for controlling the vehicle-mounted equipment;
    a diagnosing data storage zone that is arranged in the chip and stores a diagnosing data that is equivalent to the control program data, the diagnosing data provided by subjecting the control program data to an offset addressing; and
    a data abnormality diagnosing section that is arranged in the chip and detects an abnormality of the control program data by comparing the control program data with the diagnosing data.

2. A diagnosing system as claimed in claim 1, in which when sensing an abnormality of the control program data, the data abnormality diagnosing section repeatedly compares only given data that has the abnormality sensed with the diagnosing data for detecting the abnormality of the control program data.

3. A diagnosing system as claimed in claim 1, in which:
    the chip has a data storage zone that is in matrix form;
    the control program data storage zone is provided on the data storage zone and stores the control program data that is arranged in m-by-n matrix form;
    the diagnosing data storage zone is provided on the data storage zone and stores the diagnosing data that is arranged in m-by-n matrix form;
    either one of the control program data and the diagnosing data is so arranged that columns or rows of the control program data and columns or rows of the diagnosing data coincide on the data storage zone; and
    arrangement of the diagnosing data in m-by-n matrix form differs from arrangement of the control program data.

4. A diagnosing system as claimed in claim 1, in which the vehicle-mounted equipment is an electric power steering device that has an electric motor for providing steered road wheels of an associated motor vehicle with a steering force, and in which the control device controls operation of the electric motor.

5. A diagnosing system as claimed in claim 1, in which the data abnormality diagnosing section includes a time counting-up section which carries out:
    when the abnormality of the control program is sensed, starting a time count-up and continuing the time count-up every given time;
    when the sensed abnormality of the control program data is dissolved, resetting the count-up; and
    when a count-up time value reaches a predetermined time value, deciding the abnormality of the control program data.

6. A diagnosing system as claimed in claim 1, in which the chip has a RAM section capable of rewriting the data stored therein, in which the diagnosing data storage zone is provided on the RAM section and the diagnosing data is a copy of the control program data written in the RAM section.

7. A diagnosing system for diagnosing a control device of a vehicle-mounted equipment, comprising:
    a chip having an integrated circuit that stores a control program data for controlling the vehicle-mounted equipment;
    a control program data storage zone that is arranged in the chip and stores the control program data for controlling the vehicle-mounted equipment;
    a diagnosing data storage zone that is arranged in the chip and stores a diagnosing data provided by subjecting the control program data to a bit flipping; and
    a data abnormality diagnosing section that is arranged in the chip and detects an abnormality of the control program data by comparing the control program data with the diagnosing data.

8. A diagnosing system as claimed in claim 7, in which when an abnormality of the control program data is sensed, the data abnormality diagnosing section causes only given data that has an abnormality to be repeatedly compared with the diagnosing data for the decision of the abnormality of the control program data.

9. A diagnosing system as claimed in claim 7, in which the data abnormality diagnosing section carries out calculation of a logical sum and logical multiplication of the control program data and diagnosing data and detects the abnormality of the control program data by judging whether the calculation result shows 1.

10. A diagnosing system for diagnosing a control device of a vehicle-mounted equipment, comprising:
    a chip having an integrated circuit that stores a control program data for controlling the vehicle-mounted equipment;
    a control program data storage zone that is arranged in the chip and stores the control program data for controlling the vehicle-mounted equipment;
    a diagnosing data storage zone that is arranged in the chip and stores a diagnosing data provided by subjecting the control program data to a function transformation; and
    a data abnormality diagnosing section that is arranged in the chip and detects an abnormality of the control program data by comparing the control program data with the diagnosing data.

11. A diagnosing system as claimed in claim 10, in which after the diagnosing data is provided by subjecting the control program data to the function transformation, the data abnormality diagnosing section compares the diagnosing data with the control program data for detecting the abnormality of the control program data.

12. A diagnosing system as claimed in claim 10, in which after the diagnosing data is provided by subjecting the control program data to a bit flipping, the data abnormality diagnosing section compares the diagnosing data with the control program data for detecting the abnormality of the control program data.

13. A diagnosing system as claimed in claim 10, in which the data abnormality diagnosing section carries out calculation of logical sum and logical multiplication of control program data and the diagnosing data and detects abnormality of the control program data by judging whether the result of the calculation shows 0 or 1.

14. A diagnosing system as claimed in claim 10,
    in which the chip has a data storage zone that is in the form of matrix,
    in which the control program data storage zone is provided on the data storage zone and stores the control program data arranged in m-by-n matrix form, in which the diagnosing data storage zone is provided on the data storage zone and stores the diagnosing data arranged in m-by-n matrix form, in which either one of the control program data and the diagnosing data is so arranged that columns or rows of the control program data and columns or rows of the diagnosing data coincide on the data storage zone, and in which arrangement of the diagnosing data in m-by-n matrix form differs from arrangement of the control program data.

* * * * *